US011619182B2

(12) United States Patent
Hrusch et al.

(10) Patent No.: US 11,619,182 B2
(45) Date of Patent: *Apr. 4, 2023

(54) ACTUATION ASSEMBLY FOR PHASER SYSTEM

(71) Applicant: Schaeffler Technologies AG & Co. KG, Herzogenaurach (DE)

(72) Inventors: Nicholas Hrusch, Wooster, OH (US); Joshua Hixenbaugh, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,316

(22) Filed: Oct. 11, 2021

(65) Prior Publication Data

US 2022/0112848 A1 Apr. 14, 2022

Related U.S. Application Data

(60) Provisional application No. 63/090,625, filed on Oct. 12, 2020.

(51) Int. Cl.
| | | |
|---|---|---|
| *F02D 15/00* | (2006.01) | |
| *F16D 3/10* | (2006.01) | |
| *F16H 1/00* | (2006.01) | |
| *F16H 35/00* | (2006.01) | |

(52) U.S. Cl.
CPC .............. *F02D 15/00* (2013.01); *F16D 3/10* (2013.01); *F16H 35/008* (2013.01)

(58) Field of Classification Search
None
See application file for complete search history.

(56) References Cited

U.S. PATENT DOCUMENTS

| | | | | |
|---|---|---|---|---|
| 4,922,790 | A | * 5/1990 | Abbott | F16H 1/46 475/341 |
| 5,123,300 | A | * 6/1992 | Himmelein | H02K 51/00 74/395 |
| 6,386,166 | B1 | * 5/2002 | Scott | F01L 1/34403 123/90.37 |
| 6,386,167 | B1 | * 5/2002 | Urckfitz | F01L 1/344 123/90.37 |

(Continued)

FOREIGN PATENT DOCUMENTS

| | | | | |
|---|---|---|---|---|
| CA | 2910872 | A1 * | 11/2014 | ............ F02B 75/047 |
| CA | 2965182 | A1 * | 11/2014 | ............ F02B 75/047 |

(Continued)

*Primary Examiner* — Kevin R Steckbauer
(74) *Attorney, Agent, or Firm* — Volpe Koenig

(57) ABSTRACT

A phaser system is provided. The system includes a first gear connected to a first plate, and a second gear connected to a second plate. A phaser assembly includes at least one piston plate, and axial displacement of the at least one piston plate is configured to adjust a phase between the first gear and the second gear. A hydraulic fluid actuator assembly is also provided that includes a hydraulic fluid circuit including an advance chamber defined on a first side of the at least one piston plate and a retard chamber defined on a second side of the at least one piston plate. A valve selectively pressurizes the advance chamber or the retard chamber such that the at least one piston plate is axially displaced.

20 Claims, 8 Drawing Sheets

(56) References Cited

U.S. PATENT DOCUMENTS

| | | | | |
|---|---|---|---|---|
| 6,405,696 | B1* | 6/2002 | Borraccia | F01L 1/34406 123/90.37 |
| 6,505,582 | B2* | 1/2003 | Moteki | F02B 75/048 123/48 B |
| 6,763,787 | B2* | 7/2004 | Hallenstvedt | F16D 3/10 123/78 D |
| 7,421,989 | B2* | 9/2008 | Fischer | F01L 1/3442 123/90.31 |
| 7,421,990 | B2* | 9/2008 | Taye | F01L 1/344 123/90.15 |
| 8,516,983 | B2* | 8/2013 | David | F01L 1/344 123/90.15 |
| 8,584,633 | B2* | 11/2013 | David | F01L 1/352 123/90.17 |
| 9,200,564 | B2* | 12/2015 | Blackstock | F02B 75/047 |
| 9,482,161 | B2* | 11/2016 | Nagai | F02B 75/048 |
| 9,534,513 | B2* | 1/2017 | David | F01L 1/022 |
| 9,797,307 | B2* | 10/2017 | Onigata | F02B 75/045 |
| 9,822,701 | B2* | 11/2017 | Blackstock | F02B 75/047 |
| 9,890,638 | B2* | 2/2018 | Baker, Jr. | F01B 21/02 |
| 10,138,944 | B2* | 11/2018 | Brown | F01L 1/352 |
| 10,287,972 | B2* | 5/2019 | Nagai | F16H 49/001 |
| 10,385,985 | B2* | 8/2019 | Miyachi | F16K 31/043 |
| 10,514,109 | B2* | 12/2019 | Miyachi | F01L 1/344 |
| 10,619,578 | B2* | 4/2020 | Nagai | F02B 75/048 |
| 10,876,473 | B2* | 12/2020 | Gilges | F16B 33/004 |
| 10,883,421 | B2* | 1/2021 | Onigata | F02B 75/045 |
| 11,280,263 | B2* | 3/2022 | Heinbuch | F02B 75/047 |
| 2003/0111028 | A1* | 6/2003 | Hallenstvedt | F02D 15/04 123/52.4 |
| 2006/0174616 | A1* | 8/2006 | Yoshida | F16D 31/02 60/487 |
| 2007/0056539 | A1* | 3/2007 | Fischer | F01L 1/3442 123/90.17 |
| 2008/0047511 | A1* | 2/2008 | Taye | F01L 1/352 123/90.15 |
| 2011/0030631 | A1* | 2/2011 | David | F01L 1/344 464/160 |
| 2013/0081587 | A1* | 4/2013 | David | F01L 1/344 123/90.17 |
| 2014/0326219 | A1* | 11/2014 | Blackstock | F02B 75/047 123/48 B |
| 2015/0033906 | A1* | 2/2015 | Kimus | F16H 35/008 74/568 R |
| 2015/0219009 | A1* | 8/2015 | Onigata | F02D 15/02 74/586 |
| 2015/0219022 | A1* | 8/2015 | Nagai | F02B 75/045 123/48 B |
| 2015/0354415 | A1* | 12/2015 | David | F01L 1/344 123/90.17 |
| 2016/0047301 | A1* | 2/2016 | Blackstock | F02B 75/047 123/48 B |
| 2016/0168995 | A1* | 6/2016 | Baker, Jr. | F04B 9/02 92/61 |
| 2017/0198755 | A1* | 7/2017 | Brown | F16D 3/10 |
| 2017/0254260 | A1* | 9/2017 | Yamada | F02B 75/045 |
| 2017/0284291 | A1* | 10/2017 | Zahdeh | F02B 75/045 |
| 2018/0016972 | A1* | 1/2018 | Nagai | F02B 75/32 |
| 2018/0016975 | A1* | 1/2018 | Onigata | F02B 75/045 |
| 2018/0073655 | A1* | 3/2018 | Miyachi | F16K 31/043 |
| 2018/0073656 | A1* | 3/2018 | Miyachi | F01L 1/352 |
| 2018/0223729 | A1* | 8/2018 | Gilges | F02B 75/045 |
| 2018/0223730 | A1* | 8/2018 | Suda | F02B 75/04 |
| 2019/0072044 | A1* | 3/2019 | Nagai | F16H 49/001 |
| 2019/0186311 | A1* | 6/2019 | Nagai | F02B 75/04 |
| 2021/0340904 | A1* | 11/2021 | Heinbuch | F02B 75/045 |
| 2021/0363917 | A1* | 11/2021 | Hrusch | F02B 75/044 |
| 2021/0396174 | A1* | 12/2021 | Hrusch | F01L 1/34403 |
| 2022/0049759 | A1* | 2/2022 | Van Weelden | F16H 35/008 |
| 2022/0106916 | A1* | 4/2022 | Hrusch | F16D 3/10 |
| 2022/0107013 | A1* | 4/2022 | Sanekata | F01L 1/022 |
| 2022/0112848 | A1* | 4/2022 | Hrusch | F02D 15/00 |

FOREIGN PATENT DOCUMENTS

| | | | | |
|---|---|---|---|---|
| CA | 2965182 | C * | 12/2018 | F02B 75/047 |
| CN | 86107594 | A * | 9/1987 | F01L 1/352 |
| CN | 105042001 | A * | 11/2015 | F16D 23/025 |
| CN | 107208550 | A * | 9/2017 | F01B 31/14 |
| CN | 107829793 | A * | 3/2018 | F01L 1/344 |
| CN | 107923316 | A * | 4/2018 | F01B 31/14 |
| CN | 108291483 | A * | 7/2018 | F02B 75/04 |
| CN | 105042001 | B * | 9/2018 | F16D 23/025 |
| CN | 106460657 | B * | 6/2019 | F02B 75/048 |
| CN | 107208550 | B * | 9/2019 | F01B 31/14 |
| CN | 110513169 | A * | 11/2019 | |
| CN | 113586259 | A * | 11/2021 | F01L 1/3442 |
| CN | 114076028 | A * | 2/2022 | F16H 35/008 |
| DE | 102004019190 | A1 * | 11/2005 | F01L 1/022 |
| DE | 60122142 | T2 * | 6/2007 | F02D 15/04 |
| DE | 102010006392 | B3 * | 5/2011 | F01L 1/352 |
| DE | 102011120162 | A1 * | 6/2013 | F02B 75/047 |
| DE | 102015201804 | A1 * | 8/2015 | F02B 75/045 |
| DE | 102015201807 | A1 * | 8/2015 | F02B 75/045 |
| DE | 102015112692 | B3 * | 10/2016 | |
| DE | 112015002170 | T5 * | 1/2017 | F01L 1/352 |
| DE | 112016000475 | T5 * | 10/2017 | F01B 31/14 |
| DE | 102021106921 | A1 * | 11/2021 | F01L 1/3442 |
| EP | 1170482 | A2 * | 1/2002 | F02B 75/045 |
| EP | 1292762 | B1 * | 8/2006 | F02D 15/04 |
| EP | 1762706 | A2 * | 3/2007 | F01L 1/3442 |
| EP | 1895114 | A1 * | 3/2008 | F01L 1/344 |
| EP | 2282020 | A1 * | 2/2011 | F01L 1/344 |
| EP | 2282019 | B1 * | 3/2013 | F01L 1/022 |
| EP | 2574745 | A1 * | 4/2013 | F01L 1/344 |
| EP | 2282020 | B1 * | 5/2013 | F01L 1/344 |
| EP | 2574745 | B1 * | 4/2015 | F01L 1/344 |
| EP | 3296529 | A1 * | 3/2018 | F01L 1/047 |
| EP | 3296530 | A1 * | 3/2018 | F01L 1/344 |
| EP | 3296529 | B1 * | 5/2019 | F01L 1/047 |
| EP | 2992200 | B1 * | 7/2019 | F02B 75/047 |
| EP | 3957835 | A1 * | 2/2022 | F16H 35/008 |
| FR | 3090774 | A * | 6/2020 | F16D 25/0638 |
| GB | 2224094 | A * | 4/1990 | F01L 1/344 |
| JP | 5238686 | B2 * | 7/2013 | F01B 31/14 |
| JP | 2015145646 | A * | 8/2015 | F02B 75/045 |
| JP | 2015145647 | A * | 8/2015 | F02B 75/045 |
| JP | 2016138467 | A * | 8/2016 | F01B 31/14 |
| JP | 6084334 | B2 * | 2/2017 | F02B 75/047 |
| JP | 2017032070 | A * | 2/2017 | F01B 31/14 |
| JP | 2017150369 | A * | 8/2017 | F02B 75/04 |
| JP | 6208035 | B2 * | 10/2017 | F02B 75/045 |
| JP | 6208589 | B2 * | 10/2017 | F02B 75/045 |
| JP | 2018044500 | A * | 3/2018 | F01L 1/047 |
| JP | 2018044501 | A * | 3/2018 | F01L 1/344 |
| JP | 2018048648 | A * | 3/2018 | F02B 75/045 |
| JP | 6384020 | B2 * | 9/2018 | F01B 31/14 |
| JP | 6572664 | B2 * | 9/2019 | F01B 31/14 |
| JP | 2019157759 | A * | 9/2019 | |
| JP | 6589686 | B2 * | 10/2019 | F02B 75/04 |
| JP | 2020101118 | A * | 7/2020 | |
| JP | 6790639 | B2 * | 11/2020 | F01L 1/047 |
| JP | 6790640 | B2 * | 11/2020 | F01L 1/344 |
| JP | 6934858 | B2 * | 9/2021 | F02B 75/04 |
| JP | 2022033717 | A * | 3/2022 | F16H 35/008 |
| SE | 522629 | C2 * | 2/2004 | F02D 15/04 |
| WO | WO-0194766 | A1 * | 12/2001 | F02D 15/04 |
| WO | WO-2014179758 | A1 * | 11/2014 | F02B 75/047 |
| WO | WO-2015047420 | A1 * | 4/2015 | F01B 21/02 |
| WO | WO-2015191309 | A1 * | 12/2015 | F01L 1/352 |
| WO | WO-2016121424 | A1 * | 8/2016 | F01B 31/14 |
| WO | WO-2017021369 | A1 * | 2/2017 | F02B 75/04 |
| WO | WO-2017022434 | A1 * | 2/2017 | F01B 31/14 |
| WO | WO-2017145736 | A1 * | 8/2017 | F02B 75/04 |
| WO | WO-2019167591 | A1 * | 9/2019 | |
| WO | WO-2019176401 | A1 * | 9/2019 | |
| WO | WO-2020129661 | A1 * | 6/2020 | |

* cited by examiner

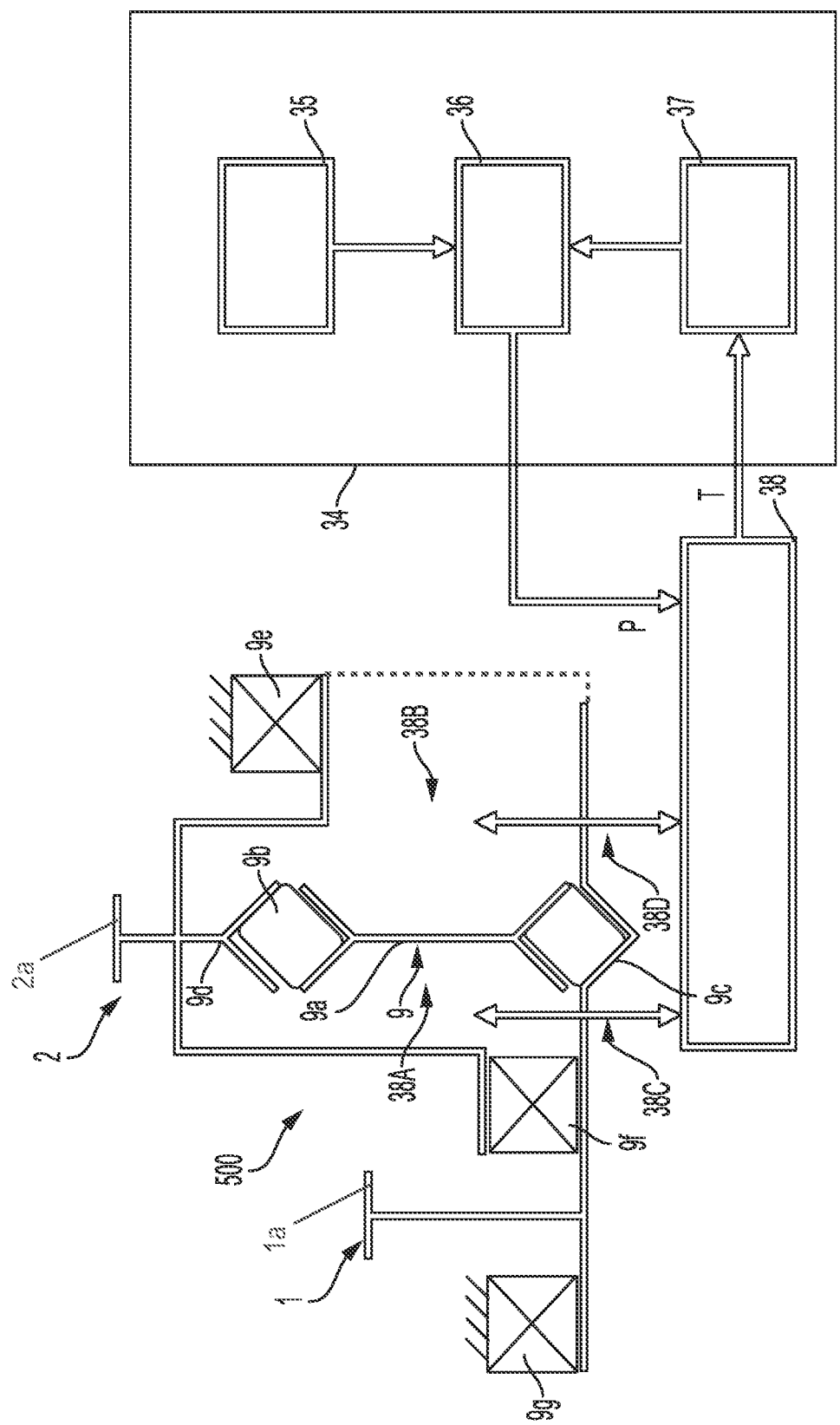

ACTUATION ASSEMBLY FOR PHASER SYSTEM

INCORPORATION BY REFERENCE

This application claims priority to U.S. Provisional Application No. 63/090,625, which was filed on Oct. 12, 2020, and is incorporated herein by reference in its entirety.

TECHNICAL FIELD

This disclosure is generally related to a cranktrain phase adjuster that can vary a compression ratio of an internal combustion (IC) engine.

BACKGROUND

Variable compression ratio (VCR) adjustment can be used in engines in order to increase engine efficiency and also reduce fuel consumption as compared to an engine with a fixed compression ratio. There are a number of configurations for VCR adjustment that employ varying structures.

A variable compression phaser is disclosed in commonly-assigned U.S. Provisional Patent Application No. 63/041,314 titled "CRANKTRAIN PHASE ADJUSTER FOR VARIABLE COMPRESSION RATIO," filed on Jun. 19, 2020 and related U.S. Non-Provisional application Ser. No. 17/350,245, titled "CRANKTRAIN PHASE ADJUSTER FOR VARIABLE COMPRESSION RATIO", filed on Jun. 17, 2021, which are both hereby incorporated by reference as if set forth fully herein.

An additional variable compression phaser is disclosed in commonly-assigned U.S. Provisional Patent Application No. 63/087,916 titled "CRANKTRAIN PHASE ADJUSTER FOR VARIABLE COMPRESSION RATIO," filed on Oct. 6, 2020, which is hereby incorporated by reference as if set forth fully herein.

It would be desirable to provide a phasing arrangement for an engine that provides direct and significant force to effectuate phasing without the need for any intermediate reductions, gears, or levers.

SUMMARY

In one aspect, a phaser system is provided. The system includes a first gear connected to a first plate, and a second gear connected to a second plate. A phaser assembly includes at least one piston plate, and axial displacement of the at least one piston plate is configured to adjust a phase between the first gear and the second gear. A hydraulic fluid actuator assembly is also provided that includes a hydraulic fluid circuit including an advance chamber defined on a first side of the at least one piston plate and a retard chamber defined on a second side of the at least one piston plate. A valve is configured to selectively pressurize either the advance chamber or the retard chamber via at least a first control line connected to the advance chamber and at least a second control line connected to the retard chamber such that the at least one piston plate is axially displaced. In one aspect, a motor pump is configured to provide fluid to the phaser assembly. In one aspect, an engine pump is also configured to provide fluid to the phaser assembly.

The hydraulic fluid actuator assembly can further comprise a motor-pump assembly configured to supply hydraulic fluid to the valve via a supply line, and configured to receive hydraulic fluid from the valve via a tank line. The motor-pump assembly includes a motor, a pump (i.e. motor pump) configured to be driven by the motor, the pump being connected to the supply line, and a reservoir connected to the tank line. The pump is configured to receive hydraulic fluid from the reservoir.

The valve can be arranged radially inward relative to the advance chamber and the retard chamber. In one aspect, the advance and retard chambers are sealed from a remainder of the phaser system. The hydraulic fluid circuit can be separate from an engine hydraulic fluid circuit and is not fluidly connected to the engine hydraulic fluid circuit.

The phaser assembly can include rolling elements, such as roller or balls, arranged supported between raceways defined by the at least one piston plate, and raceways defined on the first plate and the second plate.

The first control line and the second control line are each connected to a respective one of the advance and retard chambers, in one aspect.

The hydraulic fluid actuator assembly is mounted remotely from or external from the phaser assembly.

Additional embodiments are described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 5A is a schematic illustration of a fifth embodiment of a phaser assembly.

DETAILED DESCRIPTION

Figure 1:
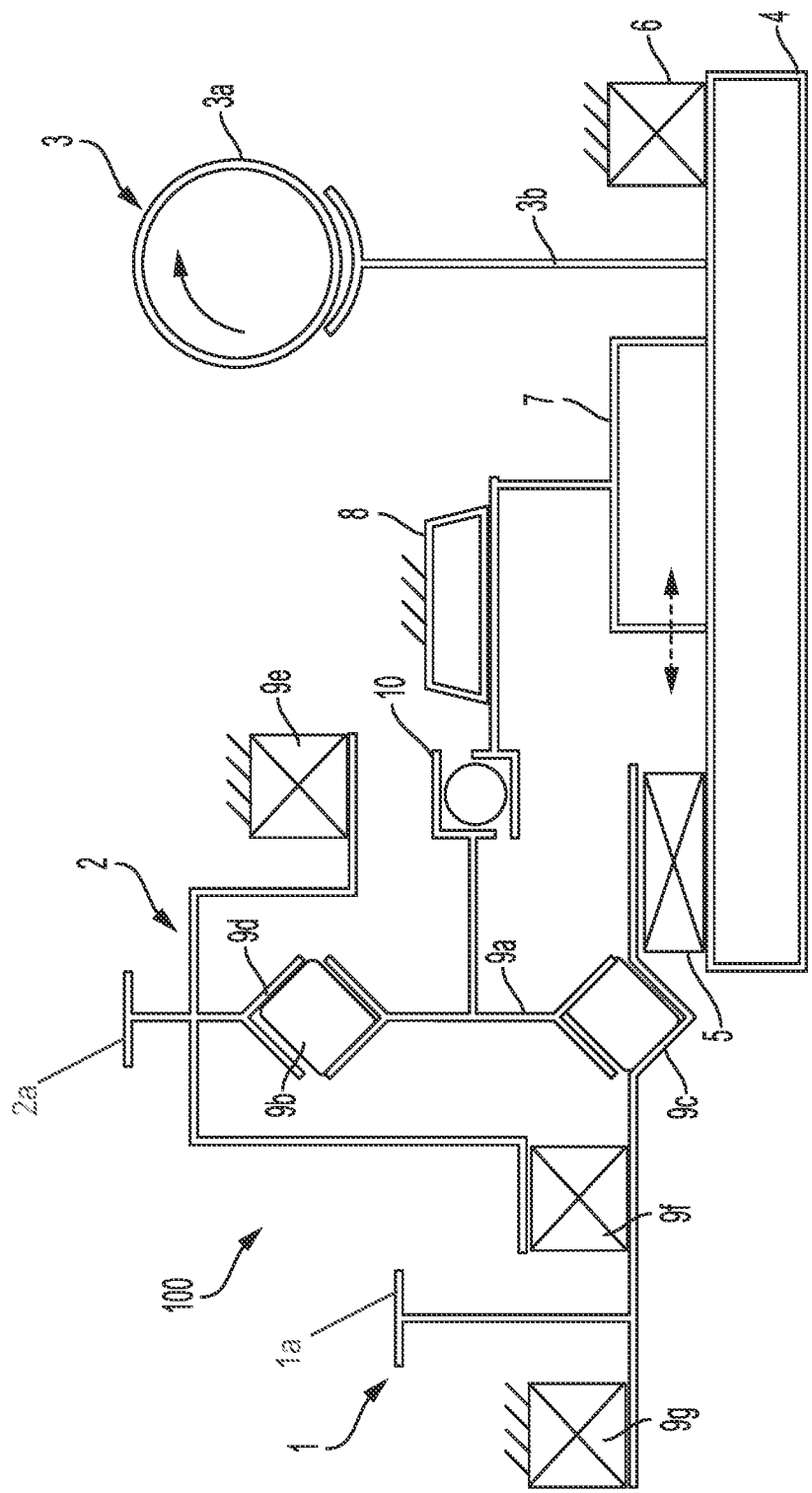
FIG. 1 is a schematic illustration of a first embodiment of a phaser assembly.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

FIGS. 1-6 illustrate various configurations for generally providing and controlling axial forces that are required to adjust phasing between two shafts, such as a crankshaft and an eccentric shaft in an engine. Each of the configurations utilize a ramp-roller assembly to adjust the phasing. In general, the ramp-roller assembly undergoes or experiences an axial force through an actuation assembly in order to adjust the phasing between a crankshaft gear and an eccentric gear, which are both connected to the ramp-roller assembly. The various configurations in FIGS. 1-6 include different types of actuation assemblies.

FIG. 1 illustrates a schematic view of a first phaser assembly 100 that is an electromechanical ramp-roller variable compression phaser with an off-axis motor and a planetary screw drive, according to an example embodiment. As shown in FIG. 1, an eccentric gear assembly 1 and a crankshaft gear assembly 2 are connected to each other via a ramp-roller assembly 9. Each of the embodiments of FIGS. 2-6 similarly include an eccentric gear assembly 1 and a crankshaft gear assembly 2.

Throughout FIGS. 1-4 and 6, an actuation system or assembly is provided on one axial side of a thrust bearing (i.e. thrust bearings 10, 16, 24, 31, 45). The actuation system can include a variety of components, such as a series of gears, shafts, nuts, anti-rotation splines, stators, rotors, ramp plates, springs, etc., which are described in more detail herein. The actuation system is provided on an opposite axial side of the thrust bearing from the ramp-roller assembly 9. The actuation system is selectively actuated to provide an axial force to the thrust bearing, and therefore an axial input or force to the ramp-roller assembly.

Referring back to FIG. 1, the first phaser assembly 100 includes a motor 3 configured to drive a worm 3a and a corresponding worm gear 3b to provide a reduction before driving a ball screw or a planetary roller screw shaft 4. In one aspect, the motor 3 is an off-axis motor. The shaft 4 is supported by at least one bearing, such as a first bearing 5 and a second bearing 6 on opposite axial ends. The shaft 4 is configured to be rotated such that the shaft 4 linearly drives a nut 7. In one aspect, the nut 7 is splined to a ground support 8 (which is also referred to as an anti-rotation spline). The axial force developed via the nut 7 is configured to be transmitted into the ramp-roller assembly 9 through the thrust bearing 10. This configuration allows the piston components of the ramp-roller assembly 9 to rotate independently of the actuator mechanism, i.e. elements 3, 3a, 4, 7, and 8. As used in this context, the term piston components can refer to a piston plate 9a connected to the thrust bearing 10. In one aspect, the piston plate 9a defines a radially inner raceway of the ramp-roller assembly 9. Rolling elements or rollers 9b are provided in the ramp-roller assembly 9. A first plate 9c including a first gear 1a and defining pockets for the rollers 9b is connected to the eccentric gear assembly 1, and a second plate 9d including a second gear 2a defining pockets for the rollers 9b is connected to the crankshaft gear assembly 2. In one aspect, two set of rollers 9b are provided that are configured to provide phase in two different rotational directions. Based on axial displacement of the piston plate 9a, respective rollers 9b frictionally engage with the plates 9c, 9d to provide phasing.

All of FIGS. 1-6 include a ramp-roller assembly to effectuate the phase adjustment between the gears 1a, 2a. One of ordinary skill in the art would understand that other types of assemblies could be used instead of a ramp-roller assembly. Functions of the ramp-roller assembly are described in more detail in U.S. Non-Provisional application Ser. No. 17/324,922, titled "CRANKTRAIN PHASE ADJUSTER FOR VARIABLE COMPRESSION RATIO," filed on May 19, 2021, which is hereby incorporated by reference as if set forth fully herein. Additional arrangements for a ramp-roller assembly are also disclosed in U.S. Provisional Patent Application 63/148,548, titled "CRANKTRAIN PHASE ADJUSTER FOR VARIABLE COMPRESSION RATIO" filed on Feb. 11, 2021, and U.S. Provisional Patent Application 63/224,376, titled "CRANKTRAIN PHASE ADJUSTER FOR VARIABLE COMPRESSION RATIO" filed on Jul. 21, 2021, which are both incorporated by reference as if set forth fully herein. As shown in FIG. 7, which is prior art and corresponds to FIG. 1 from U.S. Non-Provisional application Ser. No. 17/350,245 which is discussed above in the Background, a camshaft phaser or phaser system 700 can generally be provided that includes two gears 701, 702 such that internal components, which can include a ramp-roller assembly or other type of assembly to effectuate a phase adjustment between the two gears 701, 702. One of ordinary skill in the art would appreciate that the exact structure of the phaser system can vary depending on specific requirements of a particular application, and that any of the phaser assemblies 100, 200, 300, 400, 500, 600 disclosed herein can be incorporated within the structure generally shown for phaser system 700.

A plurality of bearings 9e, 9f, and 9g can be provided to support various aspects connected to the ramp-roller assembly 9. A first bearing 9e is provided to support one portion of the second plate 9d relative to a housing. A second bearing 9f can be provided between a portion of the first plate 9c and the second plate 9d. A third bearing 9g can be arranged between another portion of the first plate 9c and a housing or engine component. One of ordinary skill in the art would understand that additional or fewer bearings can be provided. FIGS. 2-6 similarly include the piston plate 9a, the rollers 9b, the first plate 9c, the second plate 9d, and the bearings 9e-9g.

Figure 2:
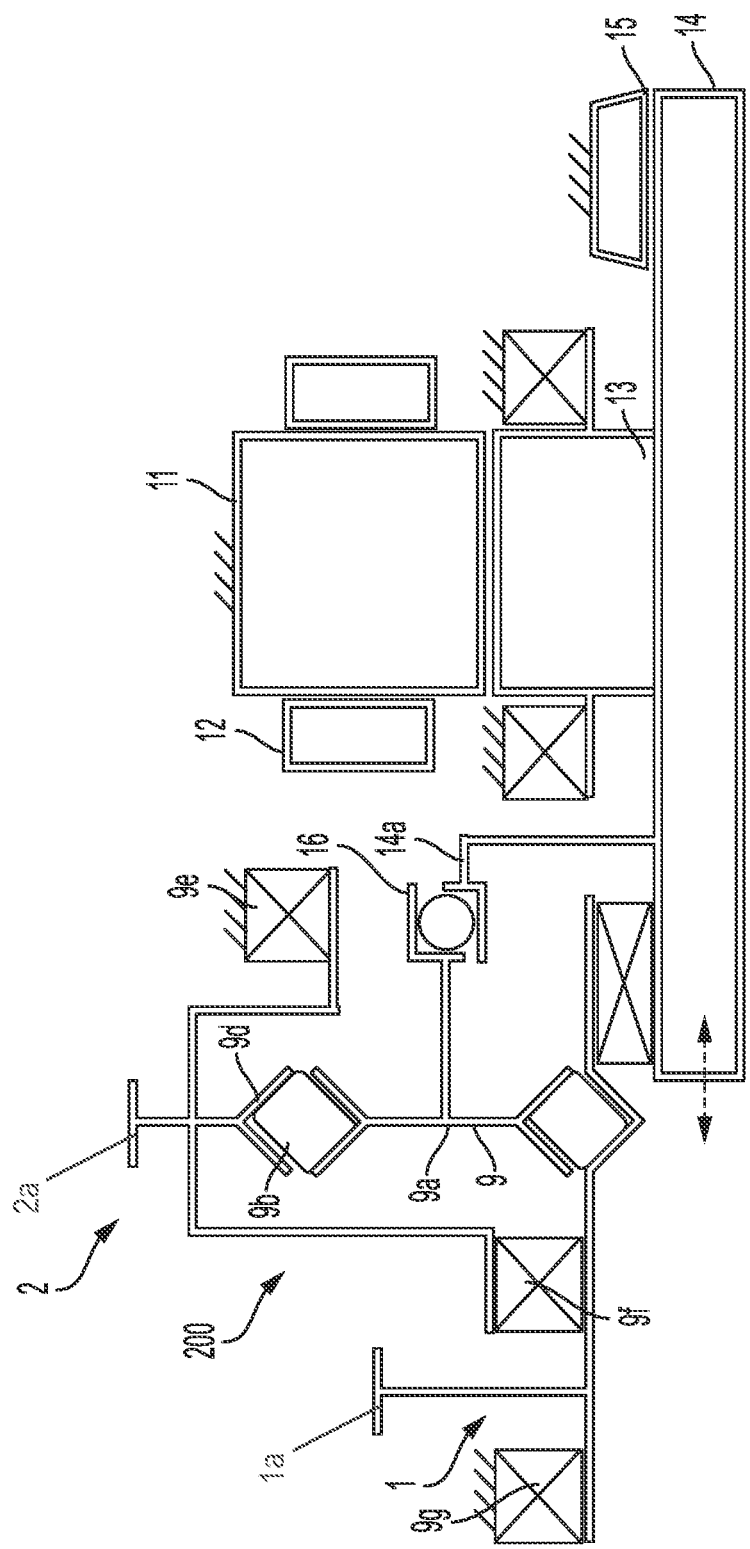
FIG. 2 is a schematic illustration of a second embodiment of a phaser assembly.

FIG. 2 illustrates a schematic view of a second phaser assembly 200. In one aspect, the phaser assembly 200 is an electromechanical ramp-roller variable compression phaser with a concentric e-motor and a planetary screw drive. The second phaser assembly 200 includes an electric motor stator 11 with windings 12 arranged on axial ends of the electric motor stator 11. A nut 13 is arranged radially inward from the stator 11 and is configured as a rotor for the electric motor. As the electric motor is energized, the nut 13 (i.e., a ball screw nut) rotates. A shaft 14 is arranged radially inward from the nut 13, and the shaft 14 is configured to be axially displaced due to rotation of the nut 13. Rotation of the nut 13 causes the shaft 14 to move linearly without rotating due to an anti-rotation spline 15 that is engaged with the shaft 14. A plate or flange 14a of the shaft 14 is connected to the thrust bearing 16. Likewise, a plate or flange of the piston plate 9a is also connected to the thrust bearing 16. The axial force on the shaft 14 acts on a thrust bearing 16 to selectively allow the piston components to rotate independently of the actuator mechanism (i.e. the electric motor stator 11, the nut 13, the shaft 14).

Figure 3:
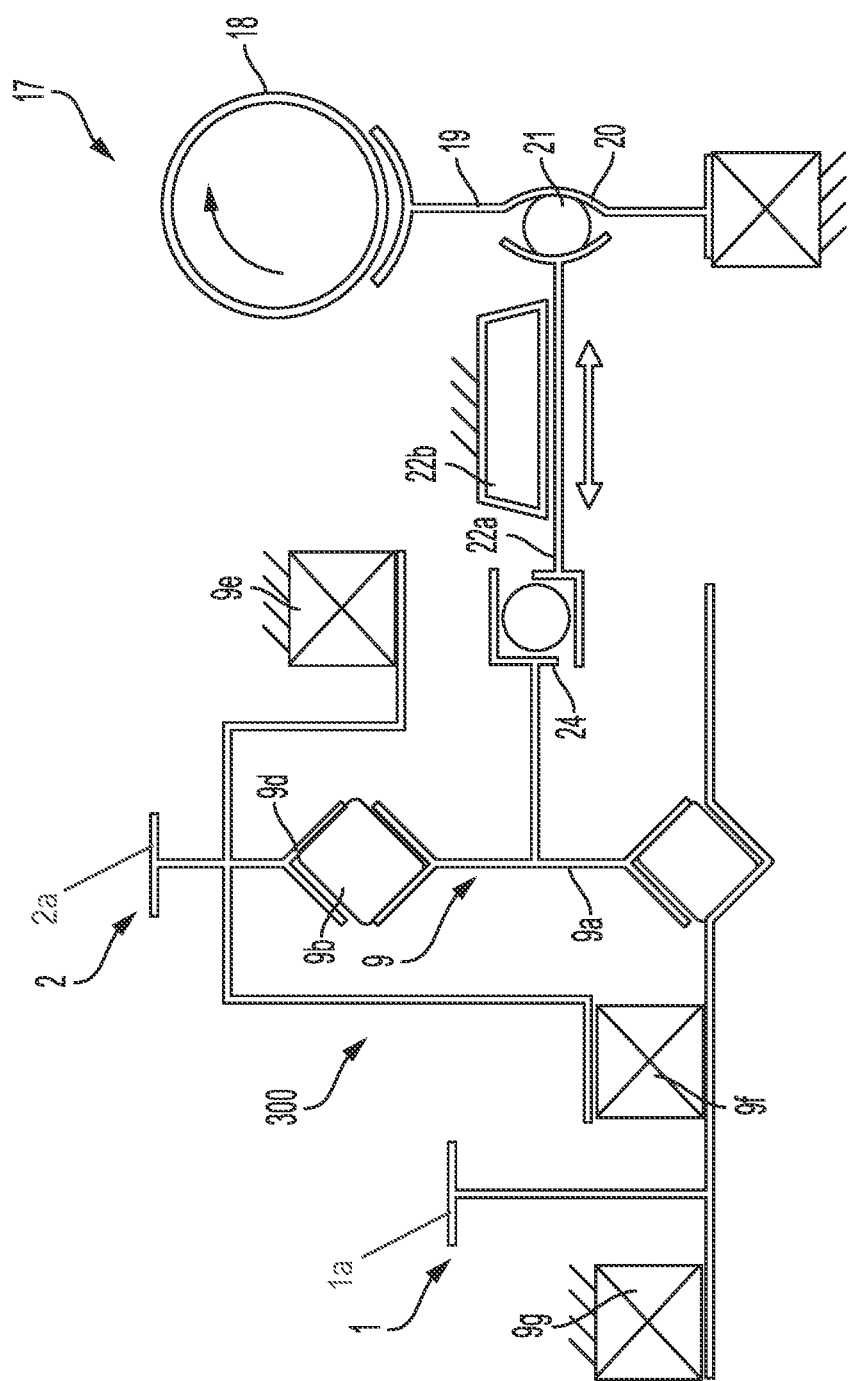
FIG. 3 is a schematic illustration of a third embodiment of a phaser assembly.

FIG. 3 illustrates a schematic view of a third phaser assembly 300. In one aspect, the phaser assembly 300 is an electromechanical ramp-roller variable compression phaser with an off-axis motor and a ball ramp. The third phaser assembly 300 includes a motor 17, which can be an off-axis motor, configured to drive a worm gear 18. A worm wheel gear 19 is configured to provide a gear ratio or reduction before driving a rotary ball ramp plate 20. The ball ramp plate 20 has a plurality of ramps configured to transmit axially displacing force into a plurality of rolling elements or balls 21. This arrangement provides an axial force or leverage against a linear ball ramp plate 22a which is splined to ground via an anti-rotation spline 22b. The axial force from the ramp plate 20 is transmitted into the linear ball ramp plate 22a and into a thrust bearing 24. The piston plate 9a is then displaced via the thrust bearing 24, allowing the piston components to rotate independently of the actuator mechanism.

Figure 4:
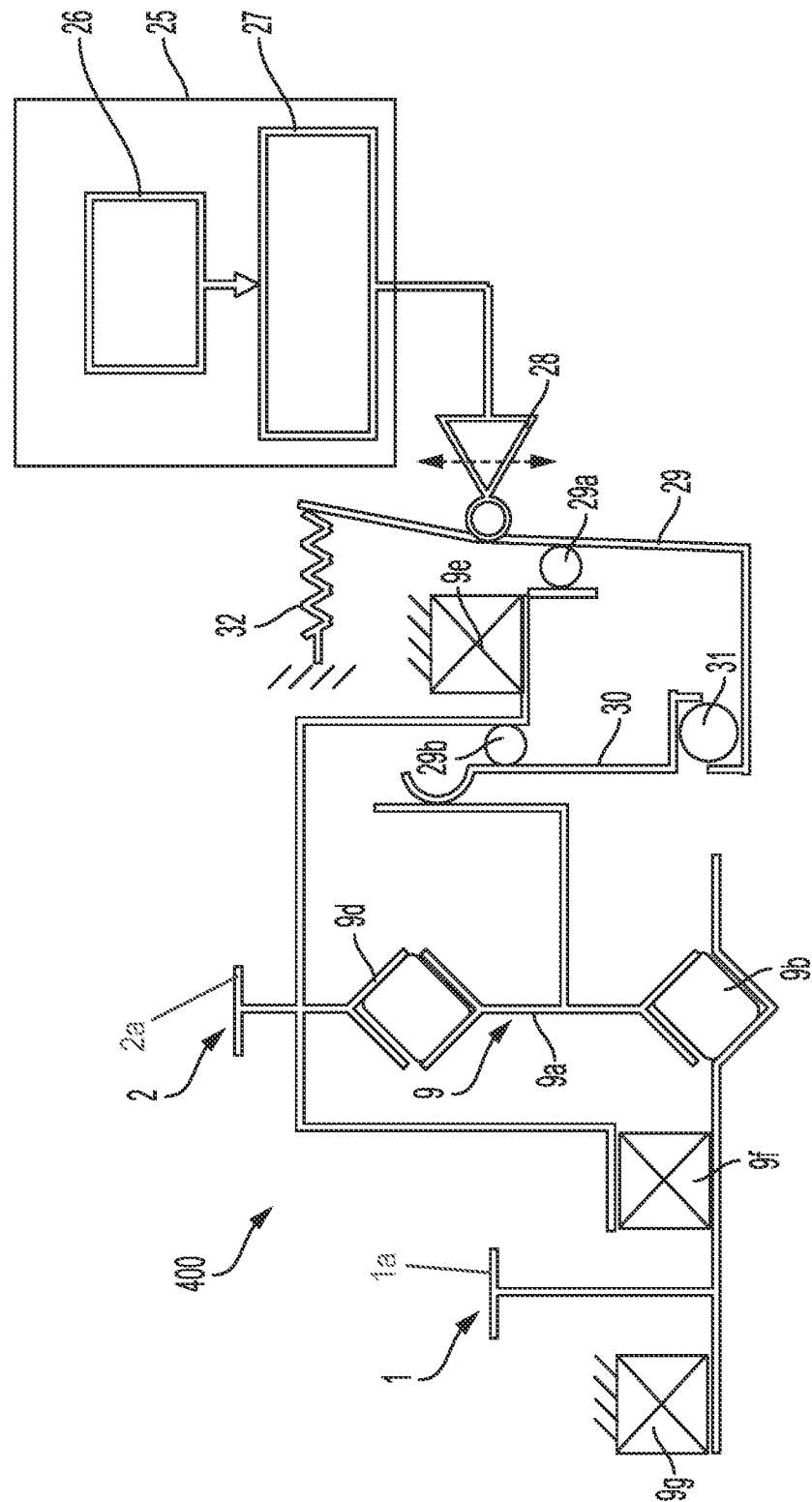
FIG. 4 is a schematic illustration of a fourth embodiment of a phaser assembly.

FIG. 4 illustrates a schematic view of a fourth phaser assembly 400. In one aspect, the phaser assembly 400 is an electromechanical ramp-roller variable compression phaser with an electromechanical clutch actuator. The fourth phaser assembly 400 includes an electromechanical clutch actuator 25. The electromechanical clutch actuator 25 includes a motor 26 and a ball screw 27 which provides axial force to adjust a fulcrum 28 on an actuator plate 29. The actuator plate 29 is indirectly connected at a first end to a first biasing element 30, such as a diaphragm spring, through a thrust bearing 31. The actuator plate 29 is connected at a second end to a second biasing element 32, such as a spring. The force balance developed between the first biasing element 30 and the second biasing element 32 determines a clamp load that is transmitted to the piston plate 9a, and thus its position. A first support 29a can be provided between the actuator plate 29 and the second plate 9d. A second support 29b can be provided between the first biasing element 30 and the second plate 9d.

FIG. 5A illustrates a schematic view of a fifth phaser assembly 500. In one aspect, the phaser assembly 500 is an electromechanical ramp-roller variable compression phaser with a hydraulic system having an integrated pump and motor. The fifth phaser assembly 500 comprises a motor-pump assembly 34 that includes a motor 35, a pump 36, and a reservoir or sump 37. In one aspect, the motor-pump assembly 34 is a closed hydraulic system. The motor 35 is configured to generate hydraulic fluid pressure and flow, which is routed through a valve 38.

In one aspect, the valve 38 is a spool valve. In another aspect, the valve 38 is a solenoid valve. One of ordinary skill in the art would understand that various types of valves could be used.

A pressure line (P) is provided between the pump 36 and the valve 38. A drainage line (T) or passageway is also provided between the valve 38 and the reservoir or sump 37. The valve 38 can be arranged radially inside of the ramp-roller assembly 9 or can be positioned off-center or remote from the ramp-roller assembly 9. The valve 38 is generally configured to phase the piston plate 9a in either an advance or retard direction. In one aspect, an advance chamber 38A can be defined on a first axial side of the ramp-roller piston assembly 9, and a retard chamber 38B can be defined on a second axial side of the ramp-roller piston assembly 9. A first control line 38C can be configured to provide hydraulic fluid to the advance chamber 38A. A second control line 38D can be configured to provide hydraulic fluid to the retard chamber 38B. A boundary for the retard chamber 38B is shown via broken lines in FIGS. 5A and 5B, and one of ordinary skill in the art would understand that the shape, geometry, volume, etc. of the chambers can vary. The control lines 38C, 38D are configured to selectively supply pressure to the advance and retard chambers 38A, 38B. Based on this configuration, the phase between the eccentric gear assembly 1 and the crankshaft gear assembly 2 can be modified.

In one aspect, the first control line 38C and the second control line 38D are each directly connected to a respective one of the advance and retard chambers 38A, 38B. In one aspect, the advance and retard chambers 38A, 38B are sealed from a remainder of the phaser system and from any other fluid circuits associated with the engine.

The motor-pump assembly 34 may be remotely mounted, in one aspect. The motor-pump assembly 34 also provides significant hydraulic force without requiring additional components that provide gear ratios or reductions, or separate levers.

In one aspect, the valve 38 is arranged radially inward relative to the advance and retard chambers 38A, 38B. This provides an axially compact arrangement.

In one aspect, the supply line (P) is directly connected between the valve 38 and the motor-pump assembly 34, and the tank line (T) is directly connected between the valve 38 and the reservoir 37.

In one aspect, a hydraulic fluid circuit defined by the arrangement in FIG. 5A is separate from the engine's hydraulic fluid circuit. One of ordinary skill in the art would understand based on this disclosure that the circuits themselves can be separated, while still being fed or supplied hydraulic fluid or oil that originates from a single, common sump.

Figure 5B:
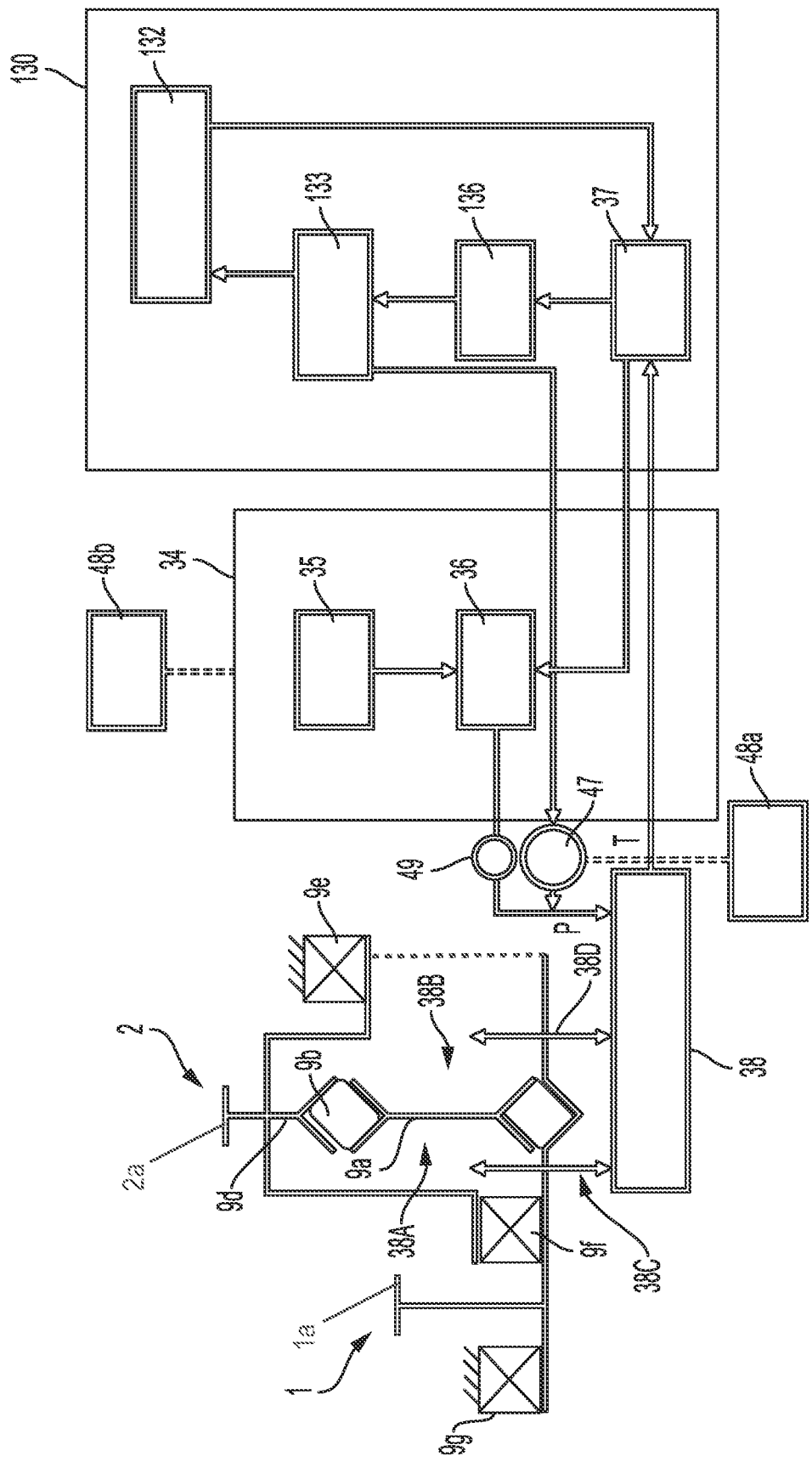
FIG. 5B is a schematic illustration of a variation for the fluid circuit of the fifth embodiment.

In another aspect, shown in FIG. 5B, in case of failure of the motor-pump assembly 34, the valve 38 can be configured to receive hydraulic fluid from another hydraulic fluid pump besides pump 36, such as a back-up pump or emergency pump. The back-up fluid pump can be the engine's main pump, in one aspect. One of ordinary skill in the art would understand that the pump could include other pumps besides the engine's main pump. The arrangement in FIG. 5B is otherwise identical to FIG. 5A except for the following modifications.

As shown in FIG. 5B, an engine system fluid circuit or gallery 130 is provided that can be in fluid connection with the valve 38. The engine system fluid circuit 130 can include the engine oil or fluid sump 37 and an engine oil or fluid pump 136. As shown in FIG. 5B, the engine pump 136 and the pump 36 of the motor-pump assembly 34 are separate and distinct from each other. In one aspect, the sump 37 is a common sump for both the motor-pump assembly 34 and the engine system fluid circuit 130. In another aspect, different sumps could be provided. The engine oil sump 37 can be connected to the valve 38 via a drainage or tank fluid line (T). Additional oil or fluid galleries 133 can be provided, as well as secondary or other engine systems 132. These systems and galleries can be associated with crankshaft journals, the camshaft, other valves, rockers or rocker assemblies, etc. The engine oil pump 136 can provide fluid to the valve 38, either directly or via the fluid galleries 133, through a valve 47. In one aspect, this valve 47 is electronically controlled via an engine control unit (ECU) 48a. The valve 47 can be selectively opened to allow hydraulic fluid to flow from the engine oil pump 136 to the valve 38 under certain conditions. For example, if or when a problem is detected with the motor-pump assembly 34, then the valve 47 can be actuated or controlled, i.e. via control signals from the ECU 48a, in order to allow hydraulic fluid to flow from the engine oil pump 136 to the valve 38 and ultimately to the phaser assembly. Problem detection of the motor-pump assembly 34 can be facilitated via feedback, such as electrical signals, from the motor-pump assembly 34. In one aspect, an electrical connection can be provided between the motor-pump assembly 34 and an additional ECU 48b. As used herein, the term problem detection can refer to detection of any malfunction, error, problem, or other issue that causes the motor-pump assembly 34 to not operate as intended. For example, if the motor-pump assembly 34 experiences power failure, or if the pump or motor unexpectedly stop running, then a problem is detected by the ECU 48b. Sensors can be integrated within the motor-pump assembly 34 to detect different types of issues of the various components therein. Data from these sensors can be transmitted as electrical signals to another component, such as the ECUs 48a, 48b, and further action can be implemented via a controller. For example, problem detection could be facilitated by using a pressure sensor that measures the hydraulic fluid pressure being fed to the valve 38. Such pressure feedback could be used alone or combined with measured motor current consumption to determine if a problem exists with the motor-pump assembly 34. In one aspect, this type of problem detection is associated with a back-up or emergency mode, which is triggered if the motor-pump assembly 34 is not running properly. Although various ECUs 48a, 48b are disclosed herein, one of ordinary skill in the art would understand that a single ECU could be configured to carry out various monitoring and control tasks and operations. Additionally, the ECUs 48a, 48b can include a controller, sensor, memory unit, processor, or other electronic component configured to implement or carry out any of the functions described herein.

In one aspect, a check valve 49 can be arranged between the pump 36 and the valve 38 to prevent back-flow of hydraulic fluid through pump 36 if the engine oil pump 136 is supplying hydraulic fluid to the valve 38. Other fluid connection arrangements between the valve 38 and pumps 36, 136 are also possible. One of ordinary skill in the art would also understand that exemplary fluid connections and pathways are shown and described regarding FIGS. 5A and 5B, while various other configurations could be provided.

In one aspect, oil or fluid can be pulled or supplied from the main engine oil sump and act as a supplemental pump that is arranged in parallel with the engine oil pump. In this aspect, two operating modes or states are possible. In a first operating mode, the valve 38 is supplied hydraulic fluid by the motor-pump assembly 34, which can be considered a primary source of pressurized hydraulic fluid for the phaser assembly. In a second operating mode, the valve 38 is supplied hydraulic fluid by the engine oil pump 136, which can be described a secondary or back-up source of hydraulic fluid for the phaser assembly. The configuration shown in FIG. 5B provides an arrangement in which a phaser assembly is adjusted or phased based on supplying hydraulic fluid. The hydraulic fluid is configured to be supplied by at least one source, such as the motor-pump assembly 34 (via pump 36), and can further be configured to be supplied by a secondary source, such as the engine system fluid circuit 130 (via pump 136). In this way, at least two pumps, i.e. pumps 36, 136, can be used to provide the actuation or phasing force required to actuate the phaser assembly.

Regarding FIG. 5B, a configuration is disclosed in which a phaser assembly is configured to be fed hydraulic fluid to affect the phase between two gears 1a, 2a primarily via a motor pump as opposed to an engine pump. In other words, as long as the motor pump is operating properly (i.e. no problems or issues are detected), then the motor pump will primarily be controlling the phasing action of the phaser assembly. In the event that an issue or problem is detected, i.e. the motor pump fails, loses power, or other event, then the engine pump will essentially take over and begin supplying hydraulic fluid to the phaser assembly to ensure the phaser system continues operating properly or perhaps to a limited functioning state that still allows vehicle operation. Various types of controllers, control units, sensors, valves, and other components could be implemented to control and detect when the engine pump instead of the motor pump will be supplying fluid to the phaser assembly.

A method of adjusting a phase between a first gear 1a and a second gear 2a is also disclosed herein. The method includes arranging a phaser assembly operatively between the first gear 1a and the second gear 2a. The phaser assembly includes at least one piston plate. The method includes providing an advance chamber on a first side of the at least one piston plate and a retard chamber on a second side of the at least one piston plate. The method includes selectively providing hydraulic fluid to the advance chamber or the retard chamber to phase the first gear 1a and the second gear 2a relative to each other via a hydraulic fluid actuator assembly. In one aspect, the hydraulic fluid is configured to be supplied via the motor-pump assembly 34. In another aspect, the hydraulic fluid is configured to be supplied by at least one of the motor-pump assembly 34 or the engine system fluid circuit 130. In a further aspect, the hydraulic fluid is configured to be supplied by the motor-pump assembly 34 and engine system fluid circuit 130, depending on the operating state or conditions of either one of the motor-pump assembly 34 and engine system fluid circuit 130.

Figure 6:
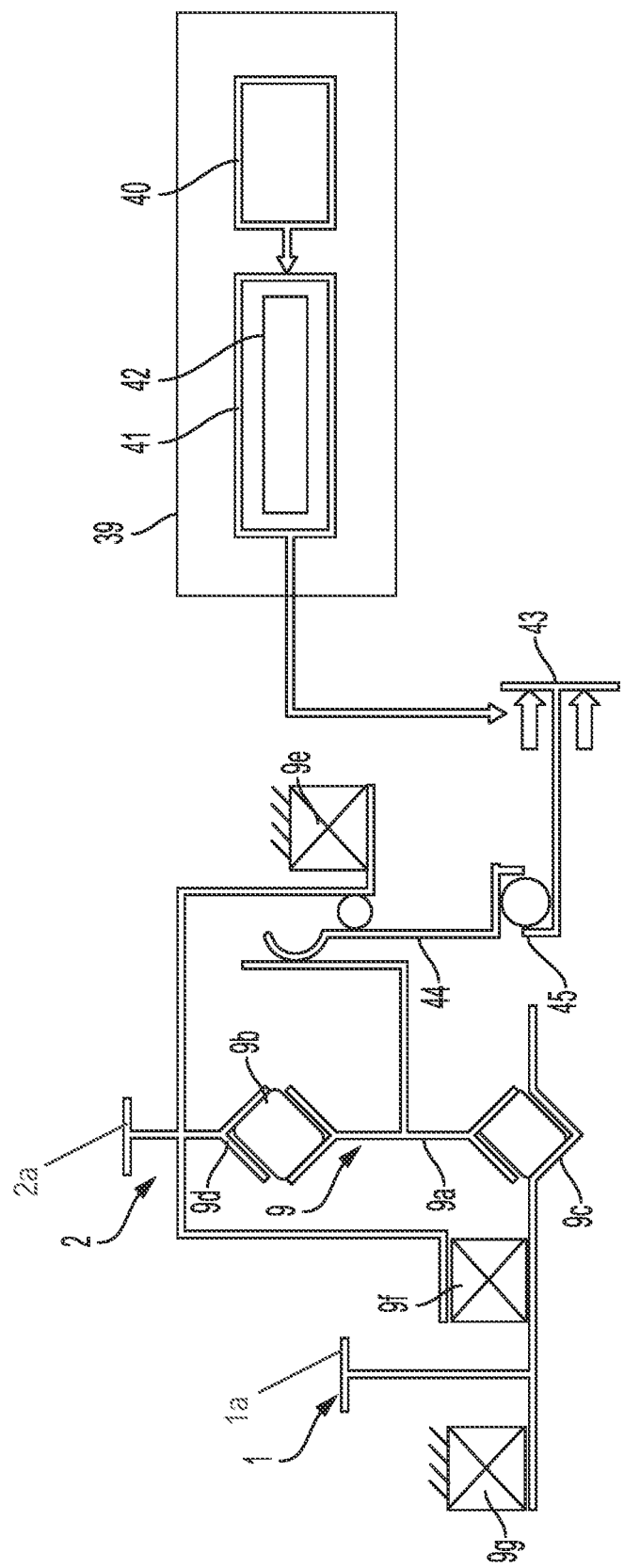
FIG. 6 is a schematic illustration of a sixth embodiment of a phaser assembly.
Figure 7:
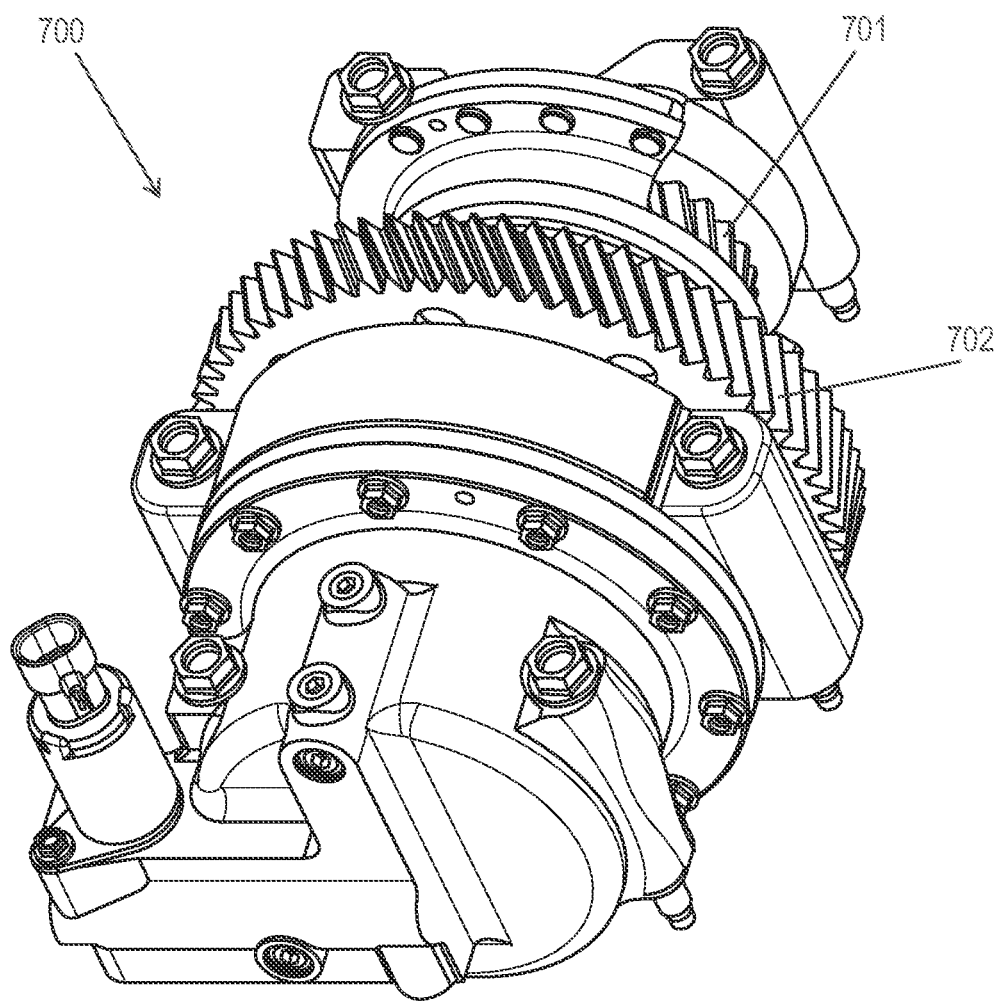
FIG. 7 is a perspective view of a phaser system according to the prior art.

FIG. 6 illustrates a schematic view of a sixth phaser assembly 600. In one aspect, the phaser assembly 600 is an electromechanical ramp-roller variable compression phaser with a closed hydraulic system having a hydrostatic clutch actuator and a slave cylinder. The phaser assembly 600 uses a hydrostatic clutch actuator (HCA) 39 which includes a motor 40 and a planetary drive 41 that generates hydraulic pressure in a piston 42. This pressure applies force to a slave cylinder 43 which selectively pulls or pushes on a first biasing element 44, such as a diaphragm, through a thrust bearing 45. This force is applied to the piston plate 9a to phase the system. This arrangement allows the HCA 39 to be remotely mounted. Additionally, the HCA 39 is configured to be capable of generating relatively high forces. One of ordinary skill in the art would understand that additional biasing elements, such as diaphragms, can be provided or the first biasing element 44 can be omitted if the extra force ratio is not needed.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

1 eccentric gear assembly
1a first gear
2 crankshaft gear assembly
2a second gear
3 motor
3a worm
3b worm gear
4 shaft
5 first bearing
6 second bearing
7 nut
8 ground support
9 ramp-roller assembly
9a piston plate 9b rollers
9c first plate
9d second plate
9e, 9f, 9g bearings
10 thrust bearing
11 electric motor stator
12 windings
13 nut
14 shaft
15 anti-rotation spline
16 thrust bearing
17 motor
18 worm gear
19 worm wheel gear
20 ball ramp plate
21 rolling elements
22a linear ball ramp plate
22b anti-rotation spline
24 thrust bearing
25 electromechanical clutch actuator
26 motor
27 ball screw
28 fulcrum
29 actuator plate
30 first biasing element
31 thrust bearing
32 second biasing element
34 motor-pump assembly
35 motor
36 pump
37 sump
38 valve
38A advance chamber
38B retard chamber
38C first control line
38D second control line
39 HCA
40 motor
41 planetary drive
42 piston
43 slave cylinder
44 first biasing element
45 thrust bearing
47 valve
48a, 48b engine control units (ECU)
49 check valve
130 engine system fluid circuit
132 secondary engine systems
133 additional oil galleries
136 engine oil pump
700 phaser system
701 first gear
702 second gear

What is claimed is:

1. A phaser system comprising:
a first gear connected to a first plate;
a second gear connected to a second plate;
a phaser assembly including at least one piston plate, wherein axial displacement of the at least one piston plate is configured to adjust a phase between the first gear and the second gear; and
a hydraulic fluid actuator assembly defining a hydraulic fluid circuit and including a motor-pump assembly including a motor pump configured to selectively provide hydraulic fluid to an advance chamber defined on a first side of the at least one piston plate or a retard chamber defined on a second side of the at least one piston plate such that the at least one piston plate is axially displaced, wherein the motor pump of the motor-pump assembly is different than an engine pump.

2. The phaser system according to claim 1, wherein the hydraulic fluid actuator assembly further comprises a valve, and the motor-pump assembly is configured to supply hydraulic fluid to the valve via a supply line.

3. The phaser system according to claim 2, wherein the valve is a spool valve.

4. The phaser system according to claim 2, wherein the valve is a solenoid valve.

5. The phaser system according to claim 2, wherein the valve is arranged radially inward relative to the advance chamber and the retard chamber.

6. The phaser system according to claim 1, wherein the phaser assembly further includes a plurality of rolling elements arranged supported between raceways defined on the at least one piston plate, and raceways defined on the first plate and the second plate.

7. The phaser system according to claim 1, wherein a first control line and a second control line are each directly connected to a respective one of the advance chamber and the retard chamber.

8. The phaser system according to claim 1, wherein the hydraulic fluid actuator assembly is mounted remotely from the phaser assembly.

9. The phaser system according to claim 1, wherein the advance chamber and the retard chamber are sealed from a remainder of the phaser system.

10. The phaser system according to claim 1, wherein the phaser assembly is configured to be selectively provided hydraulic fluid by an engine pump or the motor pump.

11. The phaser system according to claim 10, further comprising an electronically controlled valve configured to be selectively opened to provide hydraulic fluid to the phaser assembly via the engine pump.

12. The phaser system according to claim 1, further comprising an engine control unit configured to detect a state of the motor-pump assembly.

13. A phaser system comprising:
a phaser assembly including at least one piston plate arranged between an advance chamber and a retard chamber, wherein the phaser assembly is configured to adjust a phase between a first gear and a second gear based on axial displacement of the at least one piston plate;
a motor-pump assembly including a first pump configured to selectively provide hydraulic fluid to either the advance or retard chamber such that the at least one piston plate is axially displaced in a first operating state; and
a second pump that is configured to selectively provide hydraulic fluid to either the advance or retard chamber such that the at least one piston plate is axially displaced in a second operating state.

14. The phaser system according to claim 13, wherein the second pump is an engine pump.

15. The phaser system according to claim 13, further comprising a control valve configured to be opened to permit hydraulic fluid to flow from the second pump to the advance or retard chamber upon detection of a problem with the motor-pump assembly.

16. The phaser system according to claim 15, wherein the phaser assembly includes a valve, and the valve is configured to receive hydraulic fluid from both the first pump and the second pump.

17. A method of adjusting a phase between a first gear and a second gear, the method comprising:
   arranging a phaser assembly operatively between the first gear and the second gear, the phaser assembly including at least one piston plate, wherein the phaser assembly is in fluid communication with a motor pump;
   providing an advance chamber on a first side of the at least one piston plate and a retard chamber on a second side of the at least one piston plate; and
   selectively providing hydraulic fluid to the advance chamber or the retard chamber to phase the first gear and the second gear relative to each other via hydraulic fluid provided by the motor pump.

18. The method according to claim 17, wherein an engine pump is also in fluid communication with the phaser assembly, and the engine pump is configured to provide hydraulic fluid to the phaser assembly.

19. The method according to claim 18, wherein the phaser assembly is configured to receive hydraulic fluid from the motor pump in a first condition, and is configured to receive hydraulic fluid from the engine pump in a second condition.

20. The method according to claim 19, wherein an engine control unit is configured to detect a state of the motor pump, and an electronically controlled valve is configured to be selectively opened to provide hydraulic fluid to the phaser assembly via the engine pump in the second condition.

* * * * *